United States Patent
Vranjes et al.

(10) Patent No.: US 10,528,242 B2
(45) Date of Patent: *Jan. 7, 2020

(54) AUTO-GROUPING OF APPLICATION WINDOWS

(71) Applicant: Microsoft Technology Licensing, LLC, Redmond, WA (US)

(72) Inventors: Miron Vranjes, Seattle, WA (US); Matthew Worley, Bellevue, WA (US); Richard Fang, Redmond, WA (US); Nils Sundelin, Bothell, WA (US); Robert Jarrett, Seattle, WA (US); Jesse Satterfield, Seattle, WA (US); Alice Steinglass, Bellevue, WA (US); Chaitanya Sareen, Seattle, WA (US); Bret Anderson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/420,077

(22) Filed: Jan. 30, 2017

(65) Prior Publication Data

US 2017/0371530 A1    Dec. 28, 2017

Related U.S. Application Data

(63) Continuation of application No. 14/975,758, filed on Dec. 19, 2015, now Pat. No. 9,575,643, which is a
(Continued)

(51) Int. Cl.
*G06F 3/0481*    (2013.01)
*G06F 3/0484*    (2013.01)
(Continued)

(52) U.S. Cl.
CPC ........ *G06F 3/04847* (2013.01); *G06F 3/0481* (2013.01); *G06F 3/04817* (2013.01);
(Continued)

(58) Field of Classification Search
CPC ................................................... G06F 3/0481
See application file for complete search history.

(56) References Cited

U.S. PATENT DOCUMENTS 3,418,459 A * 12/1968 Purdy ...................... G06G 7/22
340/945
3,648,270 A * 3/1972 Metz ...................... G01R 13/28
340/4.5
(Continued)

FOREIGN PATENT DOCUMENTS

| CN | 1623134 A | 6/2005 |
|---|---|---|
| CN | 102197366 A | 9/2011 |

(Continued)

OTHER PUBLICATIONS

"Office Action Issued in European Patent Application No. 13773976.9", dated Jun. 7, 2018, 9 Pages.
(Continued)

*Primary Examiner* — Phenuel S Salomon

(57) ABSTRACT

Described herein are techniques for automatically forming groups of application windows. The techniques may be performed with a computing device executing a windowing system, the windowing system having a user interface element that can be interacted with by a user to manage applications executing on the computing device. Each application may correspond to a separate process and application window. It may be determined that an operation has occurred that will evict the application windows of target applications from the display, and in response an application group may be automatically formed. The application group may have indicia of the evicted target applications. The
(Continued)

application group may be provided to the user interface element, and when the user interface element is interacted with by the user the user interface element displays user-selectable graphic application indicators for both the application group and applications other than the target applications.

26 Claims, 8 Drawing Sheets

Related U.S. Application Data continuation of application No. 13/874,449, filed on Apr. 30, 2013, now Pat. No. 9,250,761.

(51) Int. Cl.
  *G06F 9/54* (2006.01)
  *G06F 9/451* (2018.01)

(52) U.S. Cl.
  CPC .............. *G06F 9/451* (2018.02); *G06F 9/542* (2013.01); *G06F 2209/545* (2013.01)

(56) References Cited

U.S. PATENT DOCUMENTS

| | | | | | |
|---|---|---|---|---|---|
| 5,371,847 | A | * | 12/1994 | Hargrove | G06F 3/0481 715/788 |
| 5,412,776 | A | * | 5/1995 | Bloomfield | G06F 3/0481 715/783 |
| 5,487,143 | A | * | 1/1996 | Southgate | G06F 3/0481 715/790 |
| 5,491,795 | A | * | 2/1996 | Beaudet | G06F 3/0481 715/804 |
| 5,499,334 | A | * | 3/1996 | Staab | G06F 3/0481 715/778 |
| 5,572,649 | A | * | 11/1996 | Elliott | G06F 3/0481 345/501 |
| 5,613,057 | A | * | 3/1997 | Caravel | G06F 16/40 715/204 |
| 5,694,561 | A | * | 12/1997 | Malamud | G06F 3/0481 715/805 |
| 5,771,042 | A | * | 6/1998 | Santos-Gomez | G06F 3/0481 715/792 |
| 5,801,699 | A | | 9/1998 | Hocker et al. | |
| 5,995,103 | A | | 11/1999 | Ashe | |
| 6,208,344 | B1 | | 3/2001 | Holzman et al. | |
| 6,388,685 | B1 | * | 5/2002 | Minoura | G06F 1/1616 715/788 |
| 6,970,749 | B1 | * | 11/2005 | Chinn | G06F 9/451 700/12 |
| 7,027,035 | B2 | * | 4/2006 | Youden | G06F 3/1423 345/1.1 |
| 7,581,192 | B2 | | 8/2009 | Stabb et al. | |
| 7,847,786 | B2 | * | 12/2010 | Schobben | B60K 35/00 345/156 |
| 8,042,110 | B1 | | 10/2011 | Kawahara et al. | |
| 8,587,546 | B1 | * | 11/2013 | El-Khoury | G06F 3/1431 345/173 |
| 8,612,883 | B2 | * | 12/2013 | Louch | G06F 3/0481 715/797 |
| 8,933,874 | B2 | * | 1/2015 | Lundqvist | G06F 1/1616 345/1.3 |
| 2001/0035882 | A1 | | 11/2001 | Stoakley et al. | |
| 2002/0036661 | A1 | | 3/2002 | Minoura et al. | |
| 2004/0066414 | A1 | | 4/2004 | Czerwinski et al. | |
| 2005/0198584 | A1 | | 9/2005 | Matthews et al. | |
| 2005/0223334 | A1 | * | 10/2005 | Guido | G06F 3/0481 715/794 |
| 2006/0248404 | A1 | * | 11/2006 | Lindsay | G06F 3/0481 714/38.14 |
| 2007/0192733 | A1 | * | 8/2007 | Horiuchi | G06F 3/0483 715/788 |
| 2008/0034317 | A1 | * | 2/2008 | Fard | G06F 3/0481 715/781 |
| 2009/0094554 | A1 | | 4/2009 | Karstens | |
| 2010/0095248 | A1 | | 4/2010 | Karstens | |
| 2010/0313164 | A1 | * | 12/2010 | Louch | G06F 3/0481 715/790 |
| 2010/0313165 | A1 | | 12/2010 | Louch et al. | |
| 2012/0081312 | A1 | * | 4/2012 | Sirpal | G06F 1/1616 345/173 |
| 2012/0096392 | A1 | | 4/2012 | Ording et al. | |
| 2012/0162266 | A1 | | 6/2012 | Douglas et al. | |
| 2013/0067412 | A1 | | 3/2013 | Leonard et al. | |

FOREIGN PATENT DOCUMENTS

| | | |
|---|---|---|
| CN | 102460370 A | 5/2012 |
| EP | 689134 A1 | 12/1995 |

OTHER PUBLICATIONS

"Create an App Group", Retrieved From: <<http://mcfedries.com/Windows8VQT/sample.pdf/>>, Oct. 16, 2012, 2 Pages.

"Group Tiles Adds Group Labels to Your Start Screen", Retrieved From: <<https://web.archive.org/web/20130328040740/http://wmpoweruser.com/group-tiles-adds-group-labels-to-your-start-screen>>, Mar. 25, 2013, 4 Pages.

"How to Use Mac Os X Lion Spaces", Retrieved From: <<https://web.archive.org/web/20120301135226/http://www.wikihow.com/Use-Mac-Os-X-Lion-Spaces>>, Mar. 1, 2012, 5 Pages.

"Final Office Action Issued in U.S. Appl. No. 13/874,449", dated May 1, 2015, 9 Pages.

"Non-Final Office Action Issued in U.S. Appl. No. 13/874,449", dated Jan. 7, 2015, 11 Pages.

"Notice of Allowance Issued in U.S. Appl. No. 13/874,449", dated Oct. 2, 2015, 9 Pages.

"Non-final Office Action Issued in U.S. Appl. No. 14/975,758", dated May 5, 2016, 6 Pages.

"Notice of Allowance Issued in U.S. Appl. No. 14/975,758", dated Oct. 7, 2016, 6 Pages.

Xue, Zhiming "Windows 8 How To: 10. Customize Metro UI-App Tiles and Groups", Retrieved From: <<http://blogs.msdn.com/b/zxue/archive/2012/03/07/win8-howto-10-customize-metro-ui-app-tiles-and-groups.aspx>>, Mar. 7, 2012, 3 Pages.

Digs, Matthew "How to Refresh the Thumbnails on Google Chrome's New Tab Page", Retrieved From: <<https://web.archive.org/web/20170124001521/http://www.howtogeek.com:80/howto/34690/refresh-most-visited-page-icons-in-google-chrome/>>, Nov. 8, 2010, 3 Pages.

Kaufman, Lori "Organize Tiles into Groups on the Metro Start Screen in Windows 8", Retrieved From: <<https://web.archive.org/web/20161107090443/http://www.howtogeek.com/122446/organize-tiles-into-groups-on-the-metro-start-screen-in-windows-8/>>, Aug. 23, 2012, 4 Pages.

"International Preliminary Report on Patentability Issued in PCT Application No. PCT/US2013/060755", dated Nov. 12, 2015, 11 Pages.

"International Search Report & Written Opinion Issued in PCT Application No. PCT/US2013/060755", dated Feb. 7, 2014, 14 Pages.

"First Office Action and Search Report Issued in Chinese Patent Application No. 201380076178.8", dated Dec. 25, 2017, 9 Pages. (W/o English Translation).

\* cited by examiner

AUTO-GROUPING OF APPLICATION WINDOWS

RELATED APPLICATIONS

This application is a continuation patent application of application with Ser. No. 14/975,758, filed Dec. 19, 2015, entitled "AUTO-GROUPING OF APPLICATION WINDOWS", which is now allowed and was a continuation of a non-provisional patent application with Ser. No. 13/874,449, filed Apr. 30, 2013, entitled "AUTO-GROUPING OF APPLICATION WINDOWS", which is now patented. The aforementioned application(s) are hereby incorporated herein by reference.

BACKGROUND

Windowing systems are well known in the art of computing. Windowing systems often provide facilities for a user to interactively manage applications (programs) with windows displayable on a display. Basic functions such as opening, closing, minimizing, maximizing, resizing, switching, and arranging applications are commonly found in some windowing systems. Some windowing systems may allow multiple windows for respective applications to be concurrently displayed on a display.

A problem recognized only by the inventors is that there are times when, due to system or user activity, a user's arrangement or layout of application windows on a display may be lost or overridden. A user's time and effort spent arranging windows may be lost when those windows are later evicted from the display. In addition, there may be times when a user would benefit from being able to manipulate a group of windows as a logical set, possibly in response to an implicit action such as launching an application.

Techniques related to grouping application windows are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are techniques for automatically forming groups of application windows. The techniques may be performed with a computing device executing a windowing system, the windowing system having a user interface element that can be interacted with by a user to manage applications executing on the computing device. Each application may correspond to a separate process and application window. It may be determined that an operation has occurred that will evict or occlude the application windows of target applications from the display, and in response an application group may be automatically formed. The application group may have indicia of the evicted target applications. The application group may be provided to the user interface element, and when the user interface element is interacted with by the user the user interface element displays user-selectable graphic application indicators for both the application group and applications other than the target applications.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to forming groups of application windows and allowing the user to interact with the groups in ways that the application windows themselves might be interacted with. Discussion will start with an overview of windowing systems. Layout and operations in a tiled windowing system are discussed next, followed by description of how and when an application group may be formed. Integration of application groups into the windowing system is then covered, along with explanation of how a user can interact with application groups and application windows in similar manners.

Figure 1:
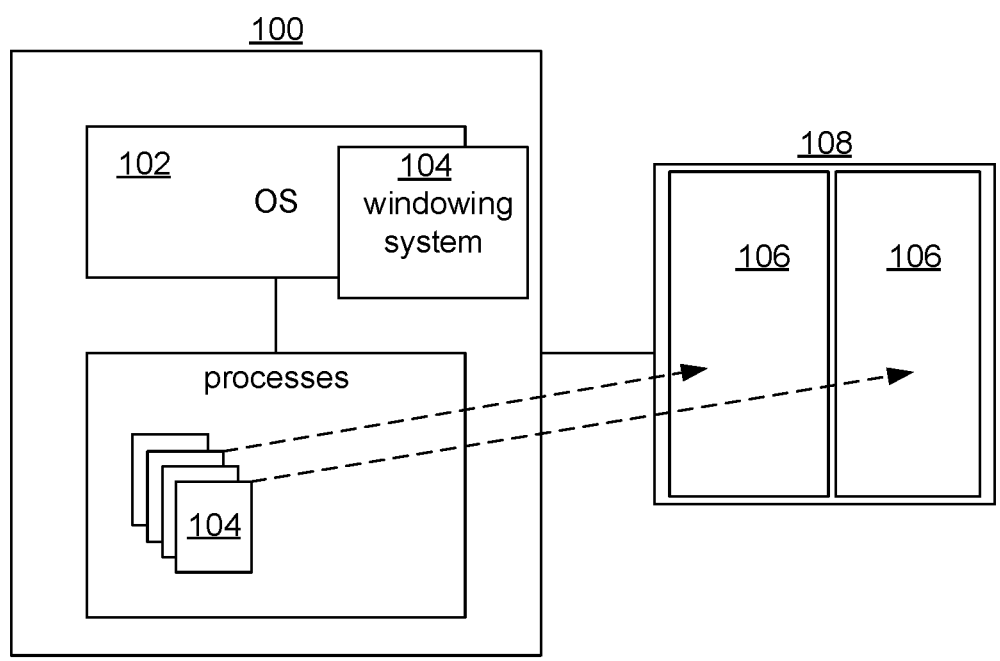
FIG. 1 shows a computing device having an operating system managing application processes and displaying corresponding windows on a display.
Figure 2:
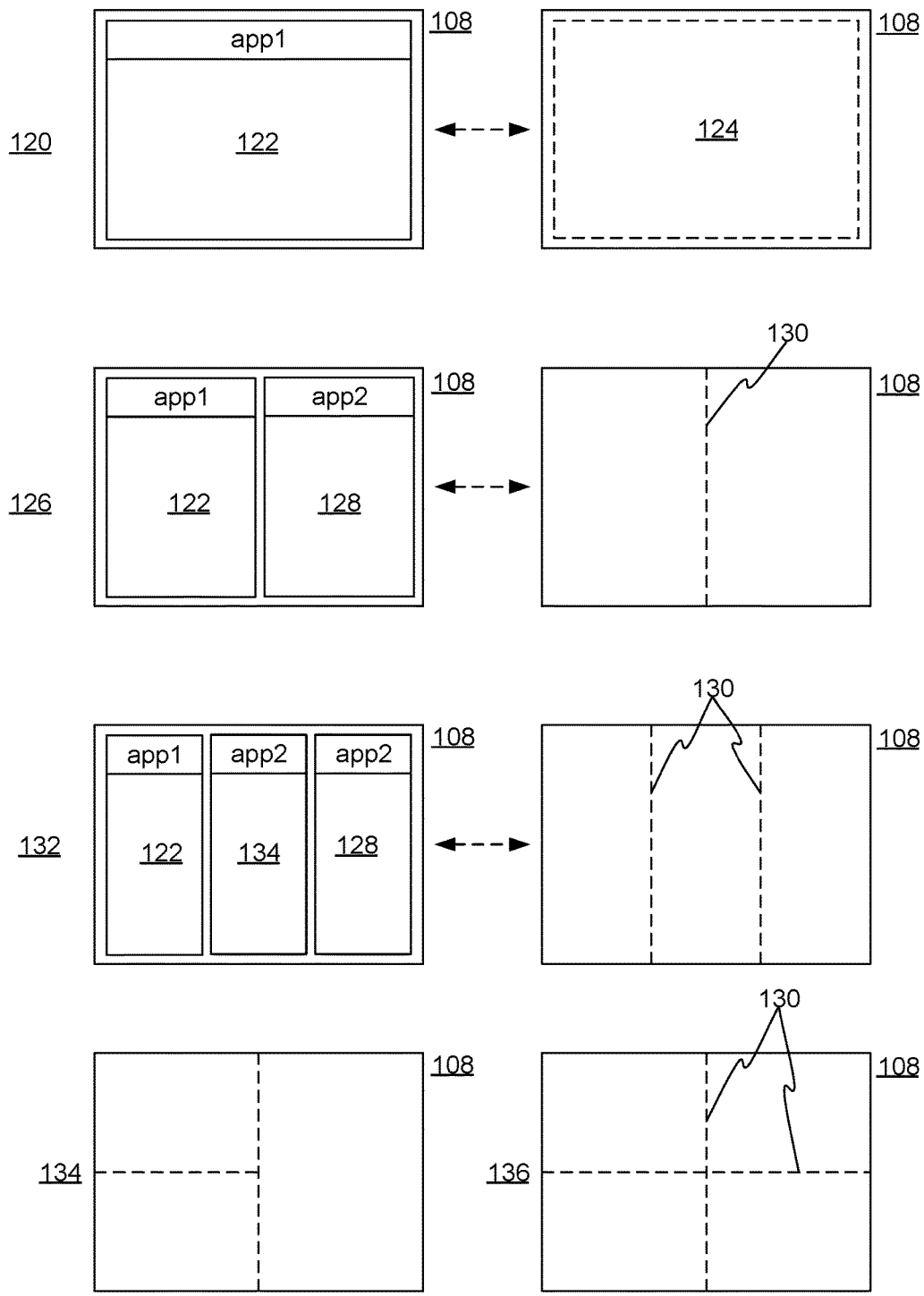
FIG. 2 shows example window layouts provided by a tiled windowing system.

FIG. 1 shows a computing device 100 having an operating system 102 managing application processes 104 and displaying corresponding windows 106 on a display 108. The computing device 100 may be any of a variety of types which are described later with reference to FIG. 8. The computing device 100 may be assumed to have at least storage and a processor for executing the operating system 102 and the application processes 104. Although there may be windowing systems with individual windows that represent multiple processes, and also processes without windows, for ease of discussion application processes 104 are assumed herein to each have at least a corresponding window 108. Processes are well known operating system objects that are discretely managed units of execution, typically having a process identifier, memory managed by the operating system (heap and/or stack memory), and may be managed in a process table of process identifiers or the like that is maintained by the operating system FIG. 2 shows example window layouts provided by a tiled windowing system. The first example layout 120 shows a first application window 122 substantially occupying the display 108 or a managed display region 124 managed by the windowing system. The second example layout 126 reflects the addition of a second application window 128. The tiled windowing system automatically manages the window layout to cause the currently displayed application windows 122, 128 to somewhat maximize occupancy of the display 108, with some display real estate possibly used for non-window graphics such as aesthetic margins, non-application user interface elements such as search bars or application selection lists, dividers for resizing application windows, etc. The tiled window manager may insert a divider 130 that can be moved by a user to resize the application windows adjacent to the divider 130.

In one embodiment, the tiled windowing system manages the layout of windows in a way that prevents application windows from occluding other application windows, possibly with exceptions such as previewing manual window rearrangements, dragging windows, and other transient conditions.

The third example layout 132 shows a third application 134 having been inserted. With tiled layout management, a user may only need to designate the third application window 134 to be inserted and/or possibly designate a slot or location for inserting the third application window 134; the tiled window manager may automatically resize the displayed application windows or take other measures to accommodate the new application window. The fourth and fifth example layouts 136, 138 show other divisions of screen real estate that may be used. For ease of discussion, examples discussed below show tiling using only a single horizontal row of application windows.

Figure 3:
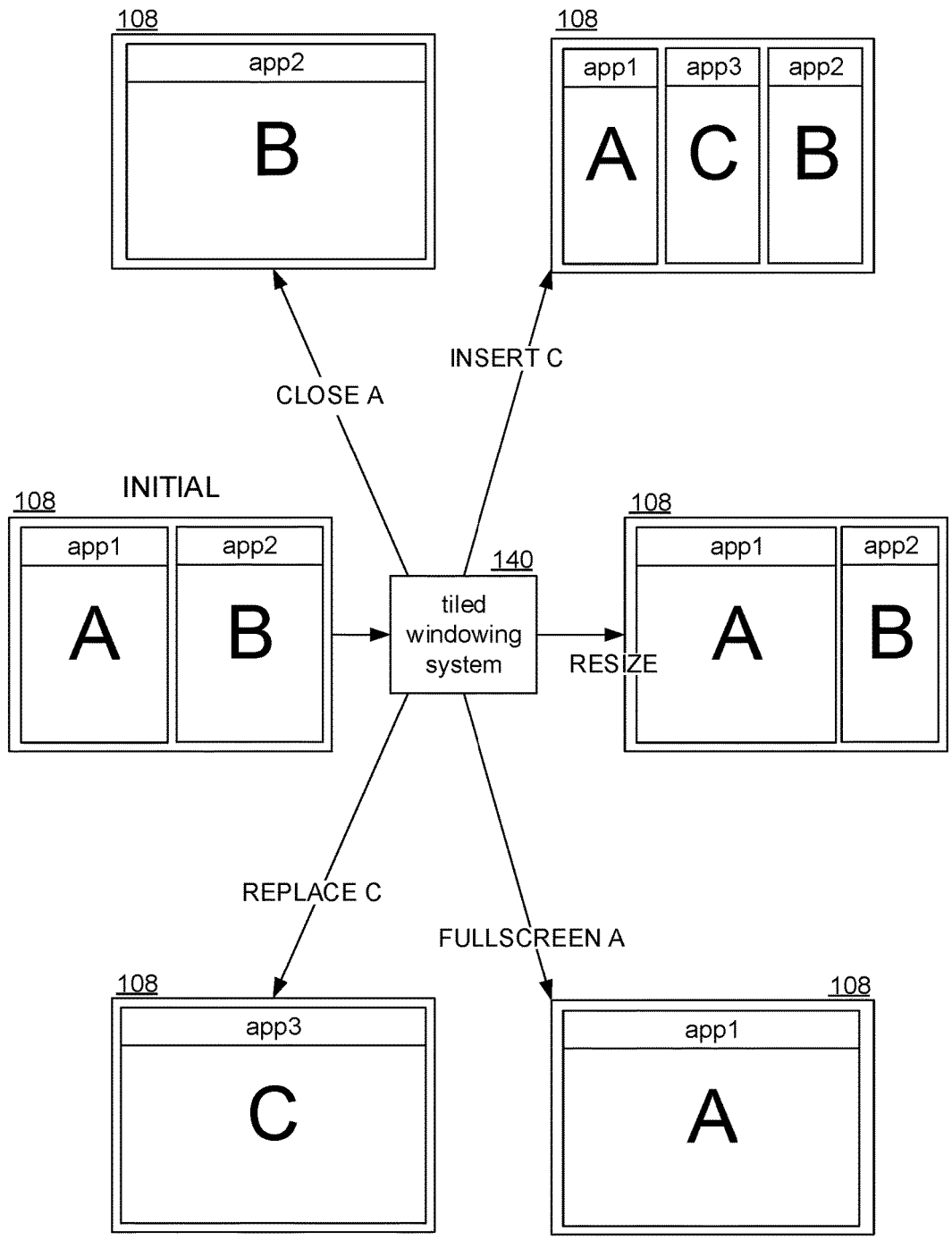
FIG. 3 shows window operations that may be performed, either manually or as a result of system events.

FIG. 3 shows window operations that may be performed, either manually or as a result of system events. Given an initial window arrangement on the display 108, a tiled windowing system 140 may close application A resulting in application B being automatically resized to occupy the display 108. An application might be closed manually or may be closed due a system event such as an error. When application C is inserted into the initial layout applications A and B are automatically resized by the tiled windowing system 140 to accommodate the newly displayed application window of application C. A resize operation may be performed, for example by user manipulation of a divider 130, to change the apportionment of display space for the application windows. If a currently displayed application or another application enters a fullscreen mode then the other application windows are evicted from the display 108. The user may select an application (e.g., application C) to replace any other applications displayed.

As can be seen, a variety of user-originated or system-originated actions can trigger the removal of application windows from the display 108. For example, a dormant off-screen application might receive a wakeup signal and automatically enter a fullscreen mode (in turn displacing application windows), or a two-display system might lose a display, which the windowing system might interpret as an event that should close the windows on the lost display. Or, an application might launch another application and the launched application might occupy the display.

Applications may be handled in different ways when they are evicted from the display 108. In some implementations, applications that are evicted from the display 108 are suspended. In other implementations applications may respond in customized ways to being displaced. For example, one application may respond to an "inactive" signal by terminating, whereas another application may respond by continuing to execute in the background. As will be described further below, the windowing system may provide user interface elements to allow a user to quickly reactivate hidden or dormant applications, open favorite or recent applications, toggle between different applications, and so forth. These same features of the windowing system may also handle application groupings, or application group objects, which may be formed by an explicit user instruction or implicitly by user or system actions that cause application windows to be evicted from the display, for example.

Figure 4:
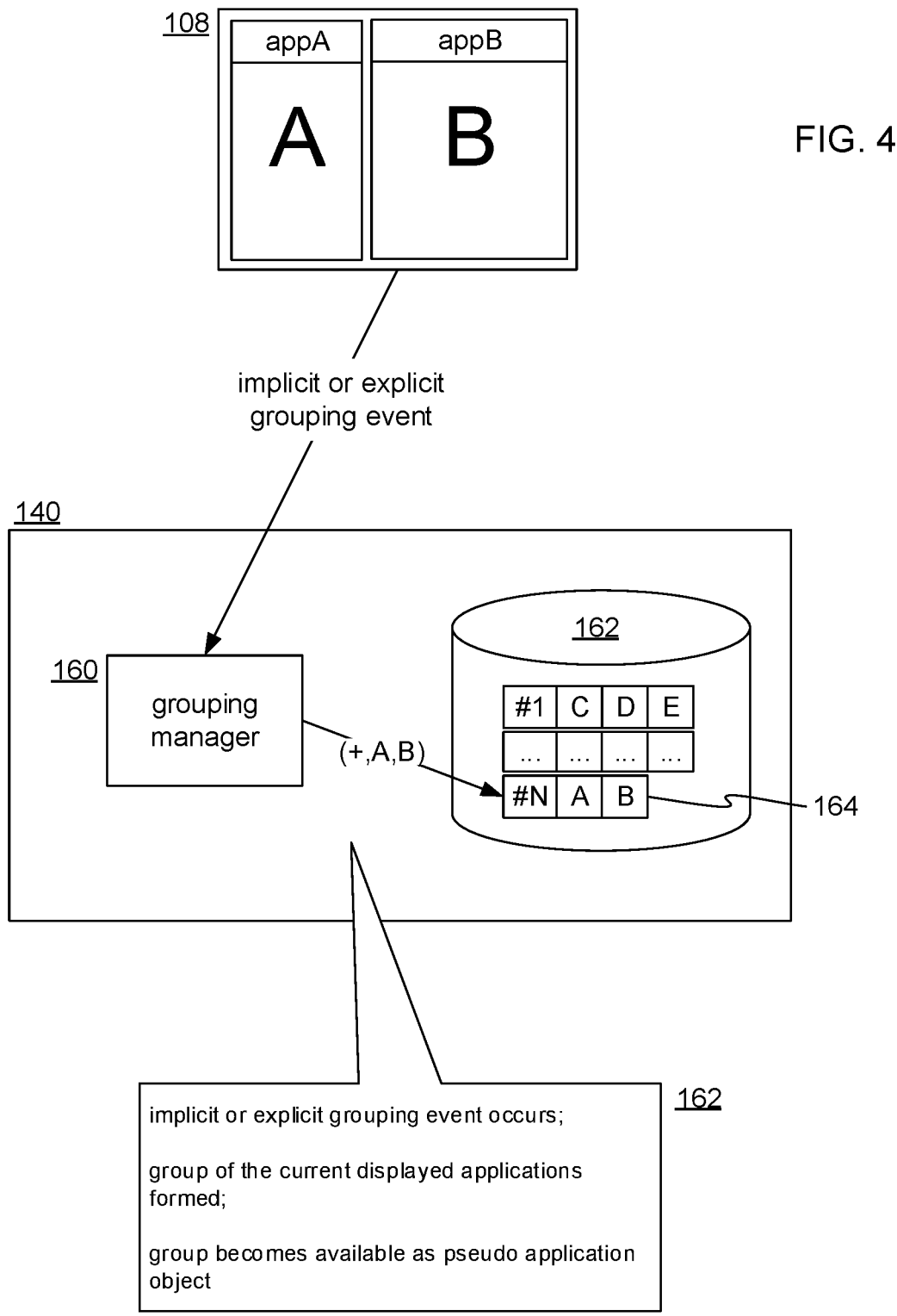
FIG. 4 shows details of a tiled windowing system for facilitating automatic grouping of application windows.

FIG. 4 shows details of the tiled windowing system 140 for facilitating automatic grouping of application windows.

Initially application windows are displayed on the display 108. In the example of FIG. 4, applications A and B are displayed. The tiled windowing system 140 performs a process 162 involving first receiving a notice or signal that a grouping event has occurred. Indicia of the currently displayed applications is formed and stored in a group store 162. The application group object 164 then becomes available as a windowing object.

The information in or associated with an application group object 164 may vary according to implementation specifics. It may be possible to have minimal information such as a list of the applications in the group and the order they appear on the screen (or, for example, a layout template and indicia of which regions thereof have which application windows). If the applications provide information about their size, such information might be sufficient to enable re-creation of the initial window layout that corresponds to the application group object 164. In other implementations, the application group object 164 might include information such as application states, window sizes and locations, and so forth. Such layout information might also include z-order information or information that binds the group of windows together in their arrangement.

The grouping manager 160 might capture an image of the display 108 when the grouping event occurs. This image may be used as a thumbnail that is displayed when the windowing system needs to graphically represent the application group object. If the applications in the group continue to execute in the background when they are undisplayed then a live thumbnail may be generated from the applications in the group.

Note that in the example of FIG. 4 the group store 162 has a row for each application group object. Each row may have an identifier (e.g., "#1") and indicia of its member, including at least information identifying which applications or application windows are in the group. In the example of FIG. 4, group "#N" is formed responsive to the grouping event received while applications A and B are displayed.

Regarding the grouping event, such an event may originate from system activities or from user activity. A number of approaches may be used to detect or signal grouping events. The windowing system may have a laundry list of high level user interactions or commands that are to trigger a grouping event. Such a list might include "fullscreen" or "maximize" commands, a logoff command, switching a multi-monitor mode from an extended mode (e.g., two monitors treated as a single virtual display) to a duplicate mode (two monitors mirroring the same graphic content), closing all windows, interactively placing a new application window in a way that displaces the currently displayed applications, and so forth. In addition, events that do not relate to displacement of windows may also trigger group captures. The windowing system may have an application programming interface (API) that is used by applications, and certain calls or methods of that API might be designed to have side effects of triggering grouping events. Other techniques for implicitly triggering grouping events may be used, such as providing a layout manager of the windowing system with logic to detect certain types of layout changes or conditions that might correspond to a group of applications being simultaneously removed from the display.

In sum, application group objects are containers that may be implicitly created to capture a screen view, and in particular application windows and their layout, before the screen view is altered, lost, displayed, etc. The application group object may have information that allows the screen view to be substantially reproduced when requested. In addition, as described next, the application group object may in some ways be treated by the windowing system as an ordinary window object subject to ad hoc manipulation by a user in some same ways that windows are interactively manipulated.

Figure 5:
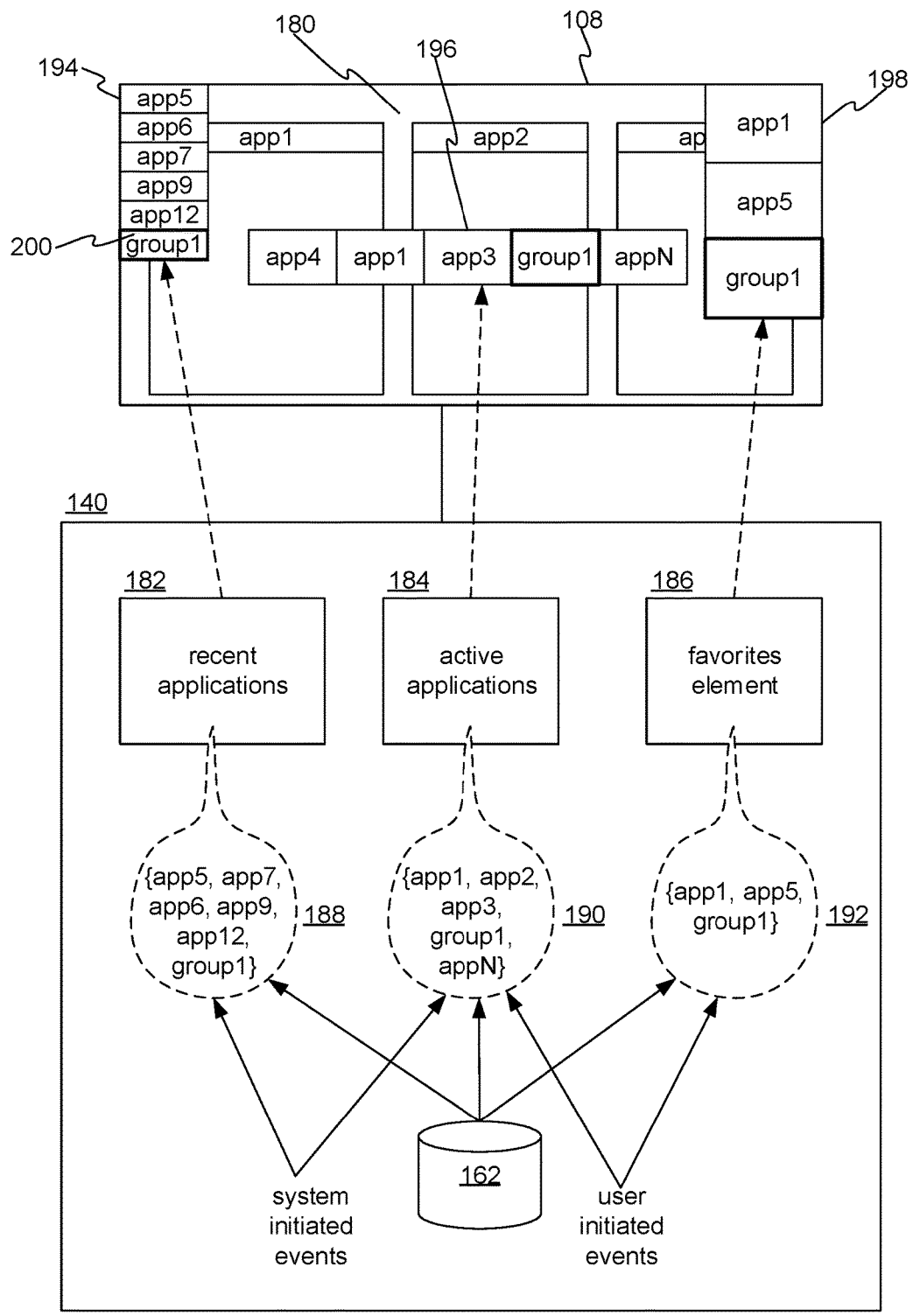
FIG. 5 shows a graphical user interface provided by or implemented on top of the tiled windowing system.

FIG. 5 shows a graphical user interface 180 provided by or implemented on top of the tiled windowing system 140. The elements or features of the graphical user interface 180 are only examples and other types of features are contemplated and equally applicable to application windows and application groups (for example, a search feature might return both applications and application group objects).

The tiled windowing system 140 may have various features or facilities that allow a user to manage applications on the computing device. Such features might include a recent applications module 182, an active applications module 184, and/or a favorites module 186. These modules cooperate with the windowing system to track the semantically relevant information. When applications are opened or used the windowing system might populate a recent-applications list 188 with indicia of recently used applications. The windowing system might similarly populate or provide an active-applications list 190, which might include applications currently displayed on any connected monitors and/or applications that are executing or suspended but are not currently displayed. Similarly, a user might maintain a favorite-applications list 192. These lists are used by the graphical user interface 180 to display corresponding user interface elements 194, 196, 198, that can be activated and used by the user to activate applications or application groups, as the case may be.

The graphical user interface 180 may be designed to handle group application objects in same ways that applications are handled. The group application objects in the group store 162 may be added to any of the application lists 188, 190, 192 and may be manipulated in the corresponding user interface elements 194, 196, 198. For example, if the user selects the "app5" icon in user interface element 194 the corresponding application might be opened and a process of interactive placement of the application might begin. On the other hand, if the application group icon 200 is selected by the user then the corresponding application group object may be accessed and used to display the application windows of the applications in the group, preferably recreating the layout of those applications when the group was formed. Note that this action might itself act as a grouping event that triggers formation of a new application group object for any applications displaced by the application windows of the selected group.

The ways in which an application group object may "stand in the place of" an application window are nearly limitless, although some such functional equivalencies may be more useful than others. User controlled windowing operations that affect application window layouts or that determine which applications are displayed/undisplayed or active/inactivated may particularly benefit from being designed to accommodate application group objects as well as applications themselves.

Figure 6:
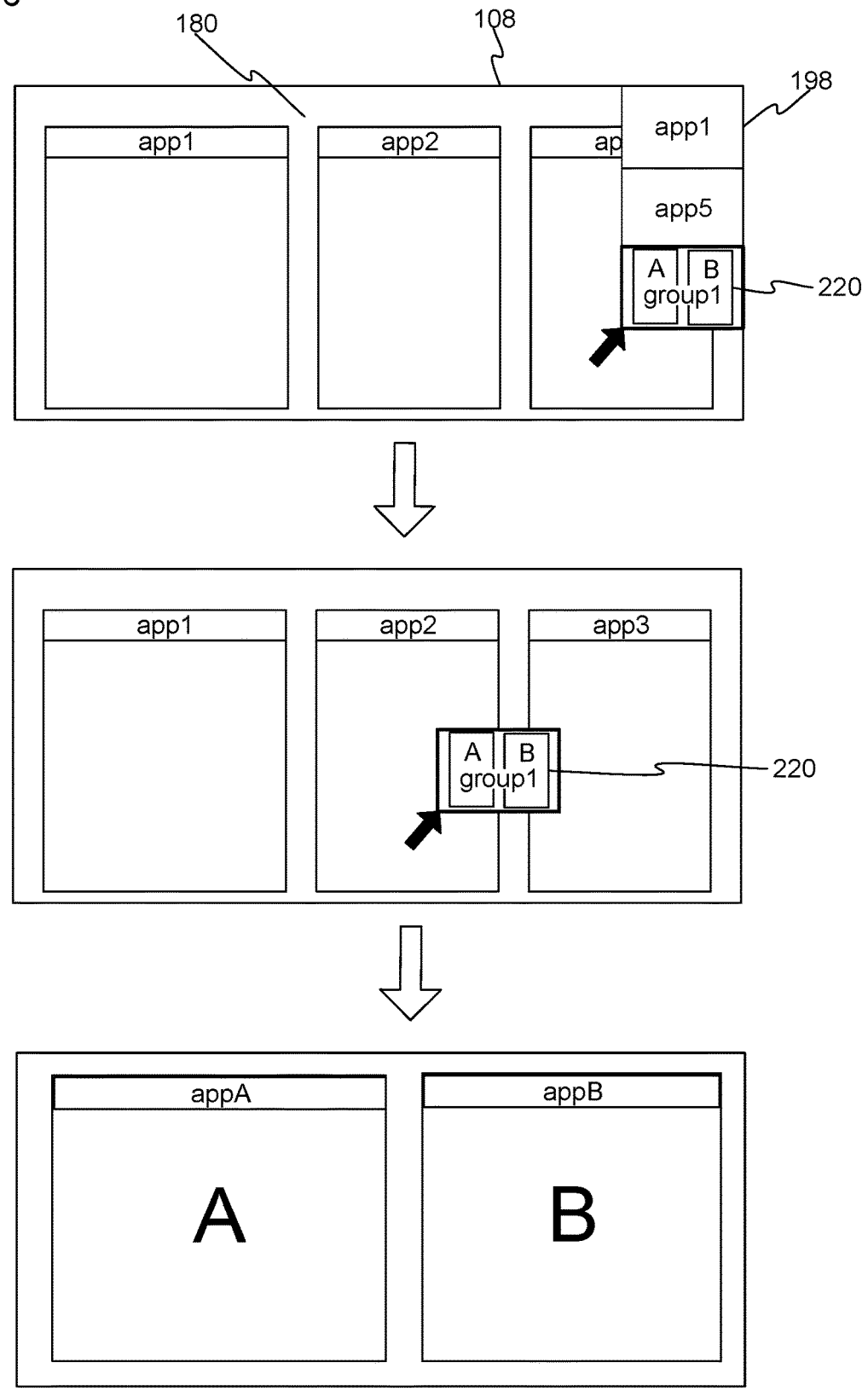
FIG. 6 shows another use of an application group.

FIG. 6 shows another use of an application group. The user interface element 198, which includes a graphic representation 220 of a corresponding application group (having applications A and B) may be displayed responsive to a user gesture, actuation of a hint, button, or the like. The graphic representation 220 may be interactively dragged from the user interface element 198 by the user, as shown in the middle part of FIG. 6. When released or dropped the application group is activated or opened. In turn, the application group object is accessed to obtain the information needed to recreate the layout of the application windows in the application group. In this example, applications A and B are opened and displayed (lower part of FIG. 6) in a layout that corresponds to their layout when the application group was formed. Various visual effects may be used. A rendering of the prior or emerging layout may be animated as enlarging to occupy the display before switching to live activation of the windows.

In one embodiment, the graphic representation 220 (whether a thumbnail or a generic symbol) may itself serve as a new user interface element that can be provided with features such as menus, selectable application icons, or inquiries that allow applications to be individually selected and activated from the group (which may or may not remove the selected application from the group). Similarly a group might be dissolved, might have its applications added to the favorites-list 192, and so on.

Figure 7:
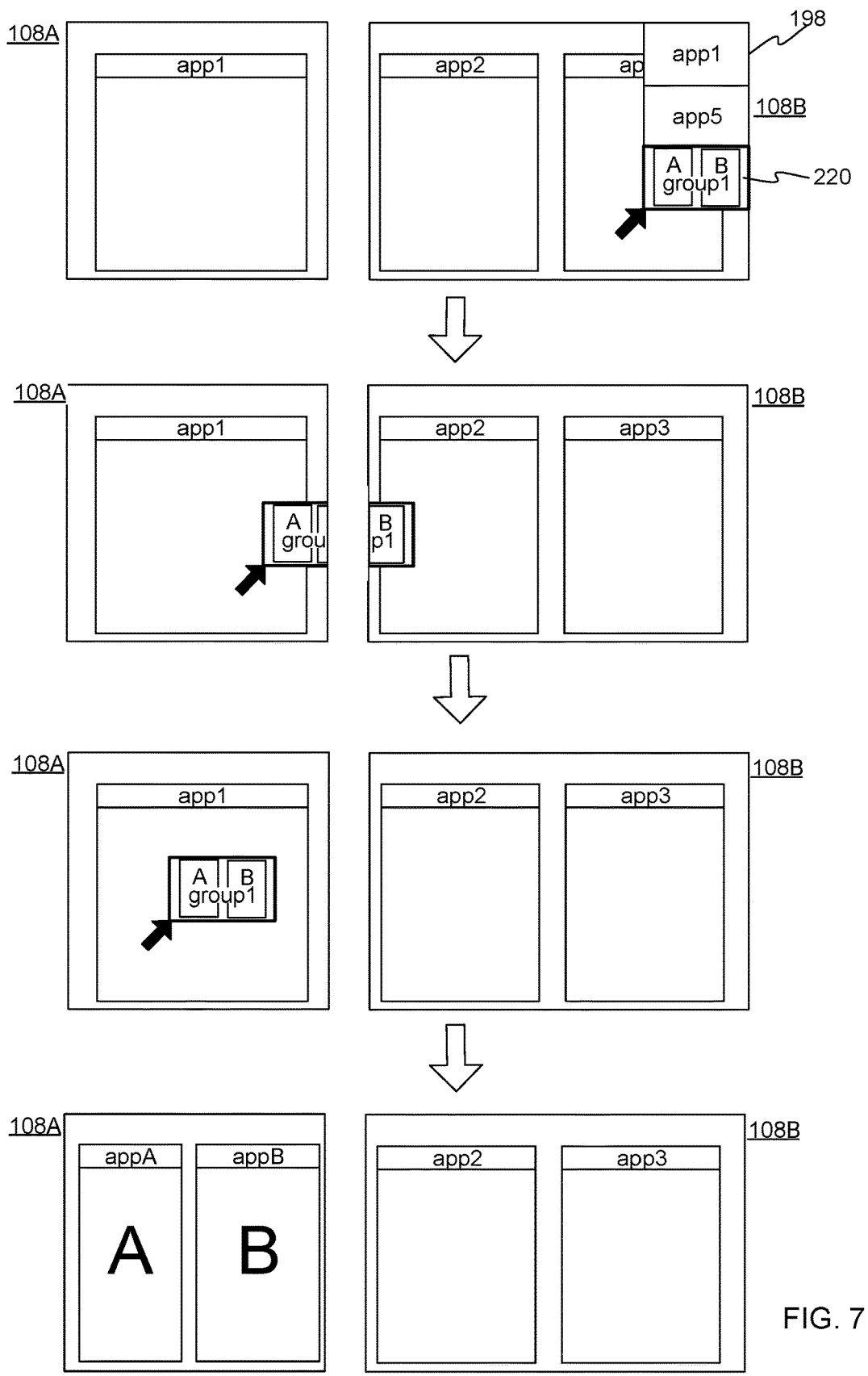
FIG. 7 shows a multi-display embodiment.

FIG. 7 shows a multi-display embodiment. As mentioned above, some windowing/operating systems are able to manage multiple monitors. In this case, the graphic representation 220 may be moved between a first display 108A and a second display 108B. The graphic representation 220 can be used to select a target one of the displays 108A, 108B, for example, by dropping the graphic representation 220 on one of the displays 108A, 108B. In the example of FIG. 7 the graphic representation 220 of the application group is dropped on the first display 108A, causing the windowing system to reference the application group object, identify the corresponding applications (A and B) and ascertain or compute their layout, and display the application windows accordingly on display 108A. If the displays 108A, 108B have different sizes, different strategies may be used to approximate the prior layout of a group, such as proportional preservation, dropping last-added or inactive applications, etc. Such strategies may be used if a group is captured from a first display and then opened later on a different display or on the same display but with different display dimension settings.

While embodiments discussed above may be implemented with and helpful for a tiled windowing system, the embodiments may be as readily implemented on non-tiling or occlusion-permitting windowing systems.

As noted, a user may also explicitly trigger a group to be formed, for instance using a specific command. In this case, the applications and layout might remain after the group is formed and stored. In other words, group formation need not be linked to eviction of application windows from a display.

In addition, while application groups have been described as useful for "reopening" a prior application window arrangement, application groups, as sets of applications, may be used in other ways as well. For example, dragging a group onto a "favorites" tool might add the member applications to the favorites. A gesture or some type of drop target (e.g., a trashcan) might be provided to terminate the processes of the member applications and to dissolve the group. Gestures for managing execution state of an application might be applied to groups to manage as a single unit the execution state of the member applications. The implicit formation of application groups in ways described above is useful regardless of how those groups are ultimately used and in fact group formation has high utility because of the many practical uses of application groupings.

Application groups may be integrated with various functions of a windowing system. For example, any manipulation of an application window, such as closing/hiding, moving, resizing, replacing, full-screening, and others may be applied to application groups.

Further regarding restoring applications in a group, in one embodiment a graphic representation of an application group can be interacted with to selectively pull out applications or divide the group. Suppose a group is created having three applications and the group is in an application switching list. The group may be selected and shown onscreen, and at that time the user may pick which of the member applications are to actually be inserted on the display; any unselected applications can remain in the group which remains in the switching list, perhaps as a new subgroup of the remaining applications.

Inclusion of the same application in different groups may be handled in different ways. Cross-group inclusion may be simply prohibited. In one embodiment, an application might retain state information for each group that it is a member of.

As discussed above, windowing systems, whether tiled or not, may at times replace or remove application windows that are currently being displayed. To avoid possible loss of a user's time spent selecting and arranging application windows, indicia of the content of a display (or a managed area thereof) may be captured and stored as an application group object. The application group object may then be used in the windowing system in places where applications or their windows are used.

Figure 8:
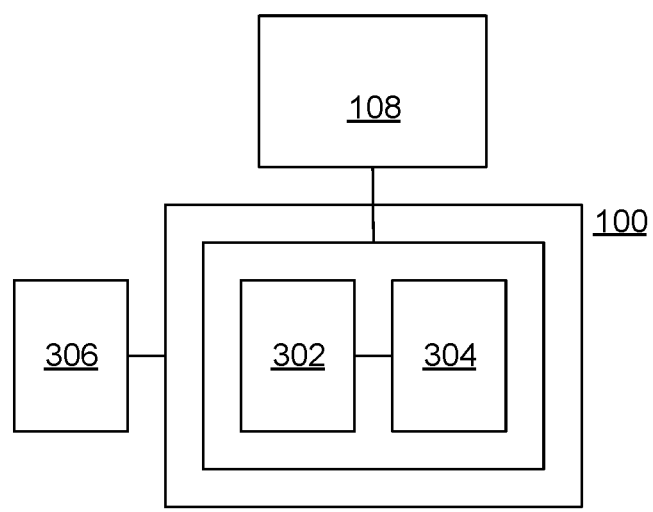
FIG. 8 shows an example of the computing device on which embodiments described above may be implemented.

FIG. 8 shows an example of the computing device 100 on which embodiments described above may be implemented. The computing device 100 may have the display 108 (or multiple displays such as the dual displays 108A, 108B discussed above), as well as storage 302 and a processor 304. These elements may cooperate in ways well understood in the art of computing. In addition, input devices 306 may be integrated with or in communication with the computing device 300. The display 108 may be a touch-sensitive display that also functions as an input device. The computing device 100 may have any form factor or be used in any type of encompassing device. For example, touch-sensitive control panels are often used to control appliances, robots, and other machines. The computing device 100 may be in the form of a handheld device such as a smartphone, a tablet computer, a gaming device, a server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or devices for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile devices storing information that allows a program or executable to be loaded and executed. The embodiments and features can be performed on any type of computing device, including portable devices, workstations, servers, mobile wireless devices, and so on.

The invention claimed is:

1. A method performed by a computing device comprising a contact-sensitive display, a processor, and storage, the storage and processor storing and executing a windowing system, the method comprising:

storing applications in the storage, the applications configured to be executed by the processor to display respective application windows on the display;

providing a user interface element comprising a set of icons, the set of icons comprising application icons that represent respective single applications, wherein activation of an application icon causes a correspondingly represented application to be displayed, and wherein the user interface element is displayed and undisplayed responsive to user inputs, wherein displaying the user interface element displays the set of icons and undisplaying the user interface element undisplays the set of icons;

responsive to a user input, executing a group-forming command to form and store an application group, the executing the group-forming command comprising identifying a first application and a second application based on their having windows displayed on the display when the group-forming command is executed, and determining a display arrangement of the windows of the first and second applications, the stored application group comprising indicia of the first application, the second application, and the display arrangement;

based on the forming the application group, adding a corresponding application-group icon to the set of icons of the user interface element, the application-group icon representing the application group; and while the user interface element and the icons in the set of icons are displayed, responding to activation of the application-group icon from the user interface element by accessing the application group, and according to the indicia of the application group, displaying a first application window of the first application and a second application window of the second application, and further according to the indicia of the application group, displaying the first application window and the second application window according to the display arrangement to reproduce the arrangement of the windows at the time of the group-forming command.

2. A method according to claim 1, further comprising enabling editing of which icons are included in the set of icons according to user inputs and editing locations of the icons within the user interface element.

3. A method according to claim 1, wherein the responding to the activation of the application-group icon further comprises undisplaying an application window displayed before the activation, entering a split-screen mode to display the first application window and the second application window, and displaying a divider between the first application window and the second application window, wherein an interactive movement of the divider resizes both the first application window and the second application window.

4. A method according to claim 1, wherein the application-group icon comprises a first graphic representing the first application and a second graphic representing the second application.

5. A method according to claim 1, further comprising managing display of the application windows in a display area such that when only one application window is displayed in the display area the one application window substantially fully occupies the display area and such that when two application windows are displayed in the display area the two application windows are maintained in a tiled arrangement to substantially fully occupy the display area.

6. A method according to claim 1, wherein responding to activation of the application-group icon further comprises starting execution of the first and second applications.

7. A method according to claim 6, wherein the starting execution comprises generating new processes managed by an operating system of the computing device, the new processes comprising the first and second applications.

8. A method according to claim 1, wherein activation of the application-group icon comprises the display sensing a contact at a display location corresponding to the application-group icon.

9. A method according to claim 1, wherein the application group is persistently stored while there are no existing executable processes for first and second applications.

10. A method according to claim 1, further comprising:
responding to a drag operation that drops the application-group icon on a graphic by deleting the group.

11. A computing device comprising:
a touch-sensitive display;
processing hardware;
storage hardware storing applications installed on an operating system, the operating system configured to manage execution of the applications and manage displaying windows of the applications on the touch-sensitive display;
the storage hardware further storing instructions executable by the processing hardware and configured to cause the processing hardware to:
perform a group-forming user command, invoked by a first user input detected by the touch-sensitive display, by automatically: (i) identifying whichever of the applications had respective windows displayed on the touch-sensitive display at the time of invoking the group-forming user command and obtaining arrangement information indicating corresponding positions of the windows of the respectively identified applications on the touch-sensitive display at the time of the invocation of the group-forming user command, and (ii) storing, in the storage hardware, an application group comprising application identifiers of the identified applications and comprising the arrangement information,
provide the application group to a user interface element, wherein the user interface element is configured to be displayed on the touch-sensitive display in response to a second user input detected by the touch-sensitive display, the user interface element comprising user-activatable graphic icons displayed together when the user interface element is displayed, the graphic icons including a first graphic icon that represents the application group and second graphic icons that represent single respective applications other than the identified applications, the first graphic icon comprises first graphic content representing and based on a first application in the application group and second graphic content representing and based on a second application in the application group,
respond to a third user input detected by the touch-sensitive display that activates the first graphic icon from the displayed user interface element, the responding comprising using the application identifiers and the arrangement information from the application group to display on the touch-sensitive display, based on the arrangement information, windows of whichever applications are identified by the application identifiers, in the order and relative sizes corresponding positions indicated by the arrangement information, and
respond to a fourth user input detected by the touch-sensitive display that activates one of the second graphic application icons from the displayed user interface element, the responding comprising displaying a window of the application corresponding to the selected second graphic application icon.

12. A computing device according to claim 11, wherein, the positions of the windows when the group-forming user command is invoked indicate ordered placement of the windows on the touch-sensitive display.

13. A computing device according to claim 11, wherein the arrangement information further comprises size information indicating sizes of the windows displayed at the time of invoking the group-forming user command.

14. A computing device according to claim 13, wherein the using the arrangement information further comprises displaying the windows of whichever applications are identified by the application identifiers with sizes based on the sizes in the arrangement information.

15. A computing device according to claim 11, wherein the windows displayed at the time of invoking the group-forming user command are separated by a divider configured to be moved responsive to user input to resize both of the windows with one movement of the divider.

16. A computing device according to claim 15, wherein when the windows of whichever applications are identified by the application identifiers are displayed based on the arrangement information such that a position of the slider bar when the arrangement information was captured is reproduced on the touch-sensitive display.

17. A computing device according to claim 11, wherein the instructions are further configured to cause the processing hardware to enable the graphic icons to be interactively rearranged by drag inputs directed to the graphic icons.

18. A computing device according to claim 11, wherein the application windows displayed in response to the third user input are displayed to substantially fully occupy the display space of the touch-sensitive display, and wherein the application window displayed in response to the fourth user input fully is displayed to fully occupy the display space of the touch-sensitive display.

19. A computing device according to claim 11, wherein the interactive selection of the first icon causes entry to a split-screen mode of displaying application windows.

20. A computing device according to claim 11, the instructions further configured to cause the computing device to respond to a drag operation that drops the first icon on a graphic by deleting the application group.

21. A computing device comprising:
a display, processing hardware, and storage hardware, the storage hardware configured to configure the processing hardware to, when the computing device is operating, perform a process, the process comprising:
responding to interactive activations of applications installed on the storage hardware of the computing device by displaying corresponding windows on the display, wherein each interactive activation of an application results in a corresponding window being displayed on the display, and wherein icons are stored on the storage hardware, the icons respectively representing the applications and application pairs, and wherein the applications are identified by respective application identifiers stored on the storage hardware, and wherein the application pairs are identified by respective pair identifiers stored on the storage hardware;

responding to determinations to respectively form an application pair by, for each determination, forming and storing a respective one of the application pairs comprising (i) a respective application pair identifier, (ii) a respective arrangement information, and (iii) a respective pair of application identifiers, wherein each arrangement information is determined in correspondence with screen positions or orders of application windows respectively associated with the application identifiers on the display when a corresponding application pair was formed, and wherein each set of application identifiers is determined according to whichever applications had application windows displayed on the display when a corresponding application pair was formed;

managing an identifier list, the identifier list stored on the storage hardware, the identifier list listing one or more application-pair identifiers and listing one or more application identifiers;

displaying a user interface element by displaying therein (i) the icons that represent the applications that have application identifiers listed in the list and (ii) the icons that represent the application pairs that have application pair identifiers listed in the identifier list; and respond to interactive selections of respective individual icons displayed in the user interface element by:
(i) whenever an icon corresponding to an application identifier listed in the identifier list is interactively selected, displaying a single window of a corresponding single application identified by the application identifier, and
(ii) whenever an icon corresponding to an application pair identifier listed in the identifier list is interactively selected, displaying an arrangement of windows of whichever respective applications are identified in the corresponding application pair, wherein the arrangement corresponds to the arrangement information in the corresponding application pair.

22. A computing device according to claim 21, wherein the managing the identifier list comprises ordering and/or adding and/or removing application identifiers and/or application pair identifiers responsive to user-inputted edits of the identifier list.

23. A computing device according to claim 21, wherein the user interface element comprises a discrete window, wherein the discrete window displays and undisplays responsive to user inputs, wherein
when the discrete window is displayed, whichever icons correspond to the identifier list are displayed, and
when the discrete window is undisplayed, whichever icons correspond to the identifier list are undisplayed.

24. A computing device according to claim 21, further comprising automatically adding an application pair identifier to the identifier list in association with formation of a corresponding new application pair.

25. A computing device according to claim 21, wherein when displaying an arrangement of windows of whichever respective applications are identified in a correspondingly activated application pair, a display area that displayed a single application window is split to accommodate the respective windows of the arrangement of windows.

26. A computing device according to claim 21, wherein displaying the window of the application corresponding to the selected other graphic application indicator in full-screen mode comprises displaying no other application windows and displaying one or more graphic toolbars.

* * * * *